Feb. 5, 1963
H. MAHN
3,076,396
DEPTH-OF-FIELD INDICATOR FOR VARIFOCAL OBJECTIVE
Filed Feb. 15, 1962
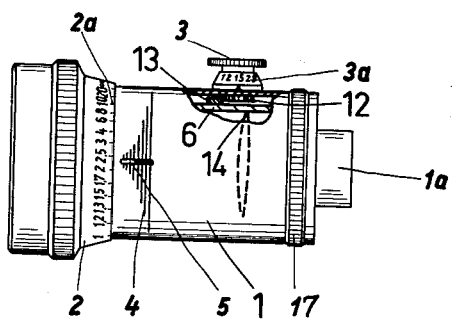
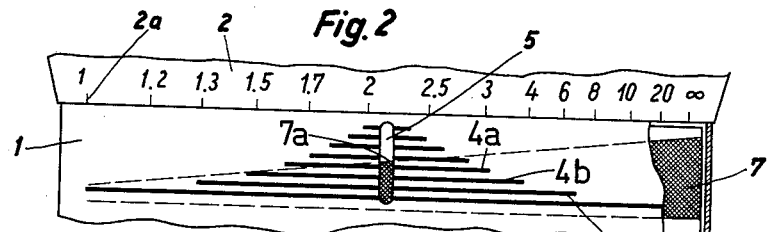
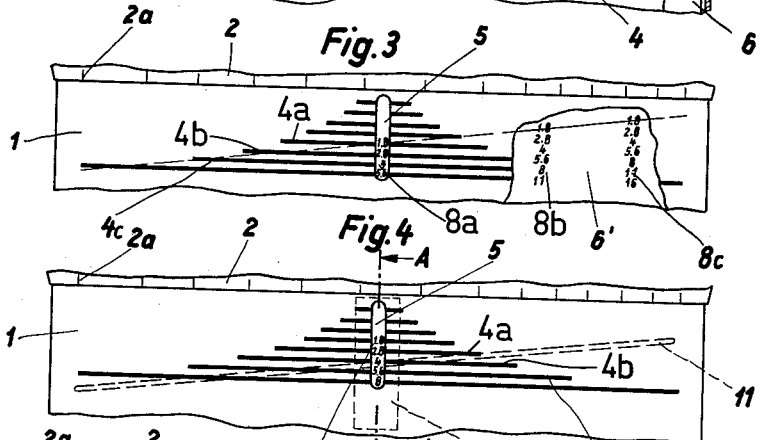
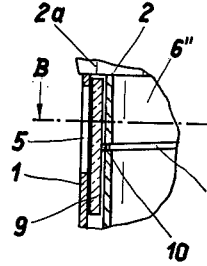
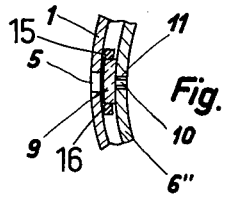
*Inventor:*
Herbert MAHN
by  *Karl J. Ross*
AGENT 3,076,396
DEPTH-OF-FIELD INDICATOR FOR
VARIFOCAL OBJECTIVE
Herbert Mahn, Kreuznach, Rhineland, Germany, assignor to Jos. Schneider & Co., Optische Werke, Kreuznach, Rhineland, Germany, a company of Germany
Filed Feb. 15, 1962, Ser. No. 173,397
Claims priority, application Germany Mar. 2, 1961
14 Claims. (Cl. 95—45)

The present invention relates to a photographic or cinematographic camera objective of the type in which one or more components are axially displaceable to change the focal length of the system.

In such varifocal objectives the depth of field is determined by three independent parameters which include distance, diaphragm aperture and focal length and which usually are controlled by separate adjusting means. This contrasts with objectives of fixed focal length wherein only the two first-mentioned parameters need to be considered, e.g. as shown and claimed in the commonly owned U.S. Patent No. 2,949,836 to Albert Baab. Thus, the system described and illustrated in that patent includes, in combination with a distance scale carried on a rotatable focusing ring, a co-operating indicator member which is axially displaceable under the control of a diaphragm-setting ring and has a distinctly marked surface portion viewable through a narrow window adjacent the scale whereby only a strip-like zone of that surface portion, varying in length with the diaphragm setting, is exposed in any position of adjustment. The range indicated by this contrastingly colored or otherwise distinctive strip also shifts upon rotation of the focusing ring with the distance scale carried thereon.

In my copending applications Ser. Nos. 161,658 and 161,660, filed December 22, 1961, I have disclosed a varifocal objective having means for indicating depth of field in dependence upon all three of the aforementioned parameters. This is accomplished, in accordance with my earlier disclosures, with the aid of an indicator member mechanically coupled with a diaphragm-control element and a focal-length-controlling element for joint displacement thereby with reference to a distance scale. The mechanism required for connecting such indicator member to the two independent controls is relatively complex and usually too cumbersome for operation by a low-power current source such as those conventionally employed to select the diaphragm stops in response to the operation of a photometric device.

It is, therefore, an object of my present invention to provide simplified means for indicating the depth of field in a varifocal camera objective.

A more particular object of this invention is to provide a depth-of-field indicator of this type whose movable element is coupled with only one of the independent controls for the two parameters other than distance, i.e. the adjusting means for the diaphragm aperture or for the focal length, preferably the latter so that any mechanical connection between this indicator member and the diaphragm control is dispensed with.

These objects are realized, in accordance with the present invention, through the provision of a fixed indicator member which may be part of the objective housing and is provided, adjacent the usually movable distance scale, with a distinctively marked surface area of progressively varying width in a direction paralleling the distance scale, this area being advantageously subdivided into a plurality of elongated zones of different length which extend in that direction and are constituted, for example, by black or colored strips similar to those provided on the movable indicator plate of the above-identified Baab patent. A movable element coacts with the indicator member and is displaceable by the adjusting means for one of the controlling parameters other than distance, preferably the focal-length selector, in such manner as to shift a mark across the distinctive indicator area in a direction generally transverse to the distance scale (and therefore also to the aforesaid elongated zones thereof) so that the width of this area at the level of the mark indicates on the scale the depth of field for a predetermined value of the remaining parameter, i.e. of diaphragm aperture where the controlling parameter is focal length. In an objective in which this remaining parameter is adjustable in discrete steps, e.g. in a camera objective with distinctly marked or indexed diaphragm stops, the spacing of these elongated zones is advantageously so selected that each of them registers the correct depth of field for a respective selectable value (e.g. diaphragm stop) of that remaining parameter.

The fixed indicator member may be provided with an elongated window or viewing slot, preferably at the center of its distinctive area, which extends perpendicular to the diaphragm scale and through which the mark borne by the movable element is visible. This mark may be constituted by the sloping boundary line of a contrastingly colored field or by an array of symbols designating different parameter values such as diaphragm apertures, these symbols being arranged in columns each adapted to register with the viewing slot in such a manner that its symbols are concurrently alignable with different zones of the indicating area. In each of these cases the movable element may be a sleeve which is rotatable about the axis of the objective housing for axially displacing one or more lens components.

It is also possible, however, to use as the coacting element a slider controlled by the focal-length selector, e.g. through the intermediary of the aforementioned sleeve, so as to be displaceable in the direction of the window or viewing slot whereby a series of symbols on that slider, such a column of diaphragm-stop markings, are individually alignable with the respective zones of the indicating area to give a reading of the depth of field along the adjacent distance scale.

The invention will be set forth with greater particularity in the following detailed description of certain embodiments, reference being made to the accompanying drawing in which:

FIG. 1 is a top plan view of a varifocal objective according to the invention;

FIG. 2 is a fragmentary plan view of the same objective, drawn to a larger scale and with parts broken away;

FIG. 3 is a view similar to FIG. 2, showing a modification;

FIG. 4 is another view similar to FIG. 2, illustrating a further embodiment;

FIG. 4a is a fragmentary sectional view taken on the line A—A of FIG. 4; and

FIG. 4b is a transverse sectional view taken on the line B—B of FIG. 4a.

The objective shown in FIG. 1 comprises the usual cylindrical housing 1 adapted to be coupled, via a rearward extension 1a, to the body of a camera (not shown) in a manner well known per se. The objective is focusable by a ring 2 carrying a distance scale 2a. The focal length of the objective is adjustable by a knob 3, carrying a scale 3a, whose rotation is communicated via a pinion 12 and an annular rack 13 to a sleeve 6 coaxial with the housing 1; one or more objective lenses, one of which is shown at 14, are displaceable within the sleeve 6 by means of suitably curved camming slots (similar to the slot 11 of FIGS. 4, 4a and 4b) engaged by radial studs (not shown) on these lenses. Housing 1 also carries a conventional diaphragm-setting ring 17 together with a suitable scale not shown.

An area of the external surface of housing 1 adjacent the rotatable distance scale 2a is distinctively marked by a series of strips 4 paralleling that scale. The area so defined is bisected by an elongated window 5 which extends in axial direction of the objective housing 1, i.e. perpendicular to the scale 2a, and reveals a small section of a contrastingly colored field 7 of triangular configuration appearing on the outer surface of sleeve 6. The boundary 7a of field 7 is partly visible through the window 5 and forms a mark coacting with the strips 4 of progressively increasing length; it will be noted that the line 7a slopes at such an angle that the position of this mark within window 5 varies between the levels of the shortest and the longest of the strips 4 throughout the range of displacement of sleeve 6 which, like that of focusing ring 2, may be an arc of about 180°.

As more clearly shown in FIG. 2, the mark 7a registers approximately with a strip 4a whose length indicates a range from about 1.6 to 3 units of length (e.g. meters or feet). This range represents the depth of field for the widest diaphragm opening, e.g. the stop "1.8," in the illustrated positions of scales 2a and 3a. If successive diaphragm stops have the values "2.8," "4," "5.6," "8," "11" and "16" (cf. of FIG. 3), then the next-adjacent longer strip 4b will designate the depth-of-field range (1.5 to 4) for the subsequent diaphragm stop ("2.8"), while the following strip 4c shows the corresponding range (1.3 to 7) for the stop after that ("4"). In this manner it will be easily possible to ascertain the correct range for each setting of the distance control 2, the focal length selector 3 and the diaphragm-setting ring 17.

The objective of FIG. 3 differs from that of FIGS. 1 and 2 only in the replacement of the sleeve 6 by a sleeve 6' carrying an array of diaphragm-stop markings, distributed over several axial columns 8a, 8b and 8c, in lieu of the contrasting field 7. It will be noted that corresponding markings (e.g. "1.8" on successive columns 8a, 8b, 8c and others not shown) are all disposed along sloping lines similar to the line 7a of FIG. 2. In the position shown in FIG. 3, for example, stop "1.8" registers with strip 4a whereas the following stops "2.8" and "4" similarly register with subsequent strips 4b and 4c; if the sleeve 6' is rotated within housing 1, the alignment between these markings and the strips shifts, the angular spacing of successive columns 8a, 8b, 8c etc. being such that the apparent displacement of a given mark (e.g. "1.8") within slot 5 equals one strip spacing for any rotation of knob 3 by one division of scale 3a. The arrangement of FIG. 3 thus eliminates the mental process of strip counting needed with the system of FIGS. 1 and 2.

In FIGS. 4, 4a and 4b I have shown a further modification wherein a sleeve 6", provided with a camming slot 11, carries a slider 9 which underlies the window 5 and is displaceable therealong, by means of a stud 10 entering the slot 11, upon rotation of the sleeve 6" by the knob 3. Slider 9 is guided against axial displacement by a pair of guard rails 15 and 16 on the inner surface of housing 1. This slider carries a column of diaphragm-stop markings 9a which are visible through the window 5 and correspond to the divisions of the diaphragm scale associated with the ring 17, the same as the symbols of columns 8a, 8b and 8c in FIG. 3. Thus, diaphragm stops "2.8," "4" and "5.6" call for the depth-of-field ranges represented by strips 4a, 4b and 4c, respectively, in the particular positions of sleeve 6" and ring 2 shown in FIG. 4.

Thus there has been provided in accordance with my invention a system for indicating depth of field with any combination of settings for the associated distance, diaphragm and focal-length controls. Except for the modification in FIG. 3, in which the focal-length adjustment is assumed to proceed in discrete steps, the arrangement is applicable to objectives in which all of these controls are continuously adjustable. Intermediate values of diaphragm stops, if available, may of course be readily interpolated between those visible in the slot 5 of FIGS. 3 and 4 or counted along the strips 4 of FIG. 2. Moreover, while the division of the indicating area of housing 1 into separate strips 4 or equivalent stepped zones facilitates the reading of discrete ranges, it will be understood that such zoning is not absolutely indispensable and can be omitted or limited to only a portion of that area. These and other modifications are believed to be readily apparent to persons skilled in the art and are intended to be embraced in the spirit and scope of the invention as defined in the appended claims.

I claim:

1. In a camera objective having means for independently adjusting at least two parameters affecting depth of field, said parameters including diaphragm aperture and focal length, the combination of a distance scale with an indicator member bearing a distinctively marked surface area of progressively varying width in a dimension parallel to said scale, and a movable coacting element bearing a mark adjacent said area, said element being coupled with the means for adjusting one of said parameters for displacing said mark across said area in a direction generally transverse to said scale whereby the width of said area at the level of said mark indicates on said scale the depth of field for a predetermined value of the remaining parameter.

2. The combination according to claim 1 wherein said remaining parameter is adjustable in discrete steps, said area being divided into a plurality of elongated zones of different length paralleling said scale, each of said zones being assigned to a respective one of said steps for indicating the depth of field pertaining to the corresponding values of said remaining parameter.

3. The combination according to claim 2 wherein said member is provided with a narrow window extending transversely to said scale, said mark being viewable through said window.

4. The combination according to claim 3 wherein said element is displaceable in a direction perpendicular to said window and provided with visual indications defining at least one sloping line, said mark being constituted by a portion of said line visible through said window.

5. The combination according to claim 4 wherein said visual indications are an array of columns of symbols designating different values of said remaining parameter, said columns being alignable with said window with each symbol thereof registering with a different one of said zones.

6. The combination according to claim 3 wherein said element is displaceable in the direction of said window.

7. The combination according to claim 6 wherein said element carries a column of symbols visible through said window and designating different values of said remaining parameter, said symbols being concurrently alignable with different ones of said zones.

8. In a camera objective having means for independently adjusting three parameters affecting depth of field, said parameters including distance, diaphragm aperture and focal length, the combination of a movable distance scale with a fixed indicator member bearing a distinctively marked surface area of progressively varying width in a dimension parallel to said scale, and a movable coacting element bearing a mark adjacent said area, said element being coupled with the means for adjusting one of said parameters other than distance for displacing said mark across said area in a direction generally transverse to said scale whereby the width of said area at the level of said mark indicates on said scale the depth of field for a predetermined value of the remaining parameter.

9. In a camera objective having means for independently adjusting a diaphragm aperture and focal length, the combination of a distance scale with an indicator member bearing a distinctively marked surface area of progressively varying width in a dimension parallel to said scale, and a movable coacting element bearing a mark adjacent said area, said element being coupled with the means for adjusting the focal length for displacing said mark across said area in a direction generally transverse to said scale whereby the width of said area at the level of said mark indicates on said scale the depth of field for a predetermined diaphragm aperture.

10. The combination according to claim 9 wherein said diaphragm aperture is adjustable in discrete steps, said area being divided into a plurality of elongated zones of different length paralleling said scale, each of said zones being assigned to a respective one of said steps for indicating the depth of field pertaining to the corresponding diaphragm apertures.

11. The combination according to claim 10 wherein said member is provided centrally of said area with a narrow window extending transversely to said scale, said mark being viewable through said window.

12. The combination according to claim 11 wherein said element is displaceable in a direction perpendicular to said window and provided with visual indications defining at least one sloping line, said mark being constituted by a portion of said line visible through said window, said visual indications being an array of columns of symbols designating different diaphragm apertures, said columns being alignable with said window with each symbol thereof registering with a different one of said zones, corresponding symbols of adjacent columns registering with successive zones.

13. The combination according to claim 11 wherein said element is displaceable in the direction of said window, said element carrying a column of symbols visible through said window and designating different diaphragm apertures, said symbols being concurrently alignable with different ones of said zones.

14. In a camera objective having means for independently adjusting distance, diaphragm aperture and focal length, the combination of a movable distance scale with a fixed indicator member bearing a distinctively marked surface area of progressively varying width in a dimension parallel to said scale, and a movable coacting element bearing a mark adjacent said area, said element being coupled with the means for adjusting the focal length for displacing said mark across said area in a direction generally transverse to said scale whereby the width of said area at the level of said mark indicates on said scale the depth of field for a predetermined diaphragm aperture.

References Cited in the file of this patent
UNITED STATES PATENTS

| | | |
|---|---|---|
| 2,949,836 | Baab | Aug. 23, 1960 |
| 2,957,398 | Gebele | Oct. 25, 1960 |
| 2,986,981 | Planert et al. | June 6, 1961 |